Nov. 17, 1925.

G. W. BRITTON 1,561,689

TYPE REGISTERING SCALE

Filed May 13, 1925

Inventor.
George W. Britton
by H. J. S. Dennison
atty.

Patented Nov. 17, 1925.

1,561,689

UNITED STATES PATENT OFFICE.

GEORGE W. BRITTON, OF HAMILTON, ONTARIO, CANADA, ASSIGNOR TO JAMES P. STEEDMAN, OF HAMILTON, CANADA.

TYPE-REGISTERING SCALE.

Application filed May 13, 1925. Serial No. 30,128.

*To all whom it may concern:*

Be it known that I, GEORGE W. BRITTON, a subject of the King of Great Britain, and resident of the city of Hamilton, county of Wentworth, Province of Ontario, in the Dominion of Canada, have invented certain new and useful Improvements in Type-Registering Scales, as described in the following specification and illustrated in the accompanying drawings, that form part of the same.

The principal object of the invention is to enable the party using the scale keeping an accurate record of the goods weighed.

The principal feature of the invention consists in arranging upon the printing ring an arrangement of characters which will print a special classifying insignia and providing an index on the face of the scale dial to be used in co-operation with the printing ring.

In the drawings Figure 1 is an elevational view of a dial of a printing dial scale showing the classifying index on the face thereof.

Figure 1:
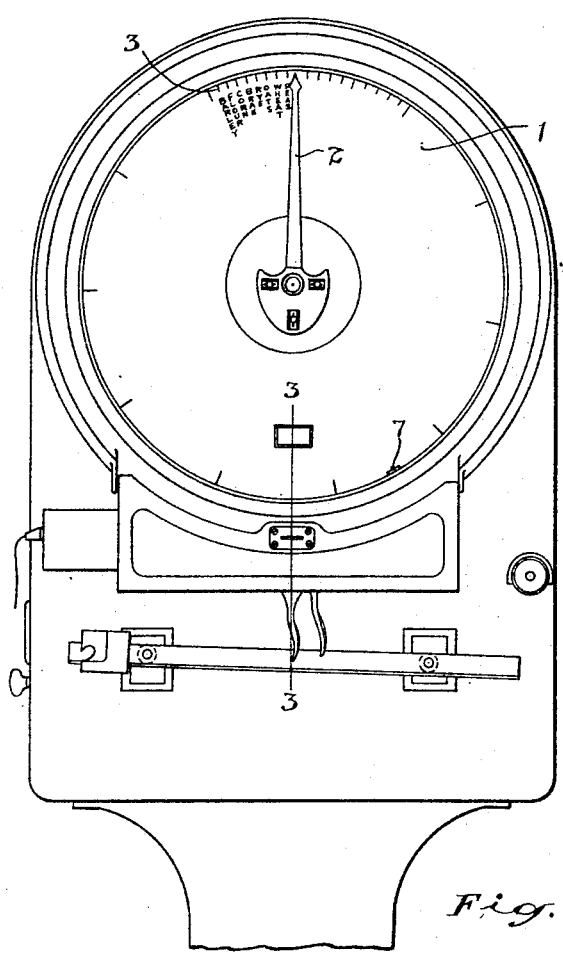
Figure 2:
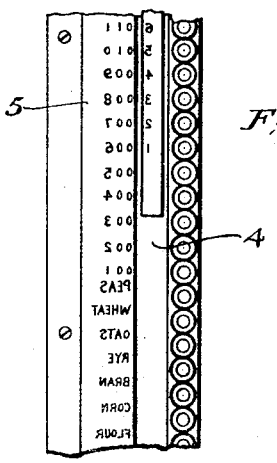
Figure 2 is an enlarged plan detail of a portion of the printing ring showing the arrangement of the special classifying characters thereon.
Figure 3:
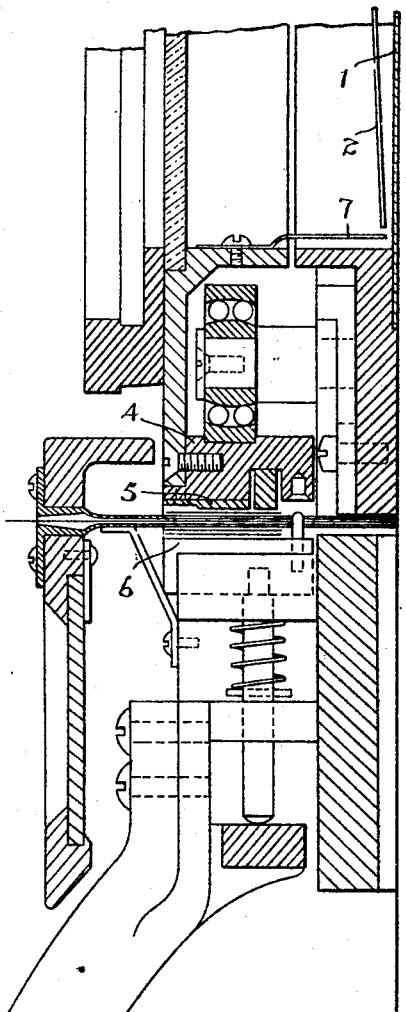
Figure 3 is an enlarged cross-sectional view through the line 3—3 of Figure 1.

Dial scales having ring attachments thereon have been known previous to this invention by means of which the weights weighed upon a scale may be recorded on a card or a record tape as disclosed in co-pending application Ser. No. 344,427 filed Dec. 12, 1919, but no means has been devised for classifying the weights so recorded.

This invention contemplates a very simple arrangement which will accomplish a very desirable result.

Upon the face of the dial 1 between the zero mark and dial capacity, over which the dial finger 2 travels, are arranged a plurality of indicating points 3 each of which is particularly designated by word or symbol.

The scale here shown is of a type wherein a printing ring 4 is rotatably mounted upon a dial structure and is provided with a type ring 5 upon which the numerals corresponding with the various weights indicated on the dial are arranged.

According to the present invention the type ring 5 is provided thereon between the zero and the dial capacity with names of characters corresponding with those arranged upon the face of the dial between the zero and the dial capacity marks so that this insignia may be moved by the rotation of the ring 4 into alignment with the printing plunger 6 by means of which the impression of the type is placed upon a ribbon or a card or both as may be found desirable.

In the operation of this invention, when a certain class of commodity is to be weighed the operator swings the printing ring around until the indicating finger 7 registers with the desired character on the classification section of the dial, such for instance, as flour, oats, wheat, etc., and when the finger is so located the printing handle is operated. This prints the name from the type ring 5 corresponding with that indicated by the finger 7 upon the card or ribbon. The goods are then weighed and the indicating finger 7 on the ring 4 is moved into register with the indicating finger 2 of the scale, thus arranging the numeral corresponding with the weight into alignment with the printing plunger and the weight is then recorded underneath the character insignia of the class of goods.

Any desirable character may of course be placed upon the dial to suit the business requirements of the customer and the use of such a scale will give immediate reckoning of the quantities of goods weighed during the day.

The invention herein described is extremely simple but it accomplishes a very desirable result and is a very valuable adjunct to a dial scale.

What I claim as my invention is:—

1. In a type registering scale, a dial having special classifying insignia thereon, and a printing ring having numerals corresponding with the numerals of the dial and type corresponding with the classifying insignia on said dial.

2. In a type registering scale, a rotatable printing ring encircling the scale dial, said dial having weight indicating divisions, and a sector between the dial capacity and zero weight indications having classifying insignia spaced therein, said printing ring having insignia corresponding with the classifying insignia on the dial and in corresponding relation to the type for printing the weights.

GEORGE W. BRITTON.